(12) United States Patent
Michail et al.

(10) Patent No.: US 6,954,211 B2
(45) Date of Patent: Oct. 11, 2005

(54) HARDWARE-ACCELERATED ANTI-ALIASED GRAPHICS

(75) Inventors: Ashraf A. Michail, Redmond, WA (US); Kun Zhou, Beijing (CN); Gregory D. Swedberg, Bellevue, WA (US); Adrian Secchia, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/610,662

(22) Filed: Jun. 30, 2003

(65) Prior Publication Data

US 2004/0263516 A1 Dec. 30, 2004

(51) Int. Cl.$^7$ ............................................. G06T 11/00
(52) U.S. Cl. ...................... 345/581; 345/423; 345/424; 345/418; 345/611; 345/612; 345/619; 345/629
(58) Field of Search ........................ 345/418, 423–426, 345/581–582, 611, 612–616, 619, 629

(56) References Cited

U.S. PATENT DOCUMENTS

| | | | | |
|---|---|---|---|---|
| 4,815,009 A | * | 3/1989 | Blatin | 345/441 |
| 5,129,051 A | * | 7/1992 | Cain | 345/423 |
| 5,133,049 A | * | 7/1992 | Cain et al. | 345/619 |
| 5,278,949 A | * | 1/1994 | Thayer | 345/426 |
| 5,303,334 A | * | 4/1994 | Snyder et al. | 358/1.9 |
| 6,288,724 B1 | * | 9/2001 | Kumar et al. | 345/621 |
| 6,348,919 B1 | * | 2/2002 | Murphy | 345/421 |
| 6,532,016 B1 | * | 3/2003 | Venkateswar et al. | 345/504 |
| 2002/0063711 A1 | * | 5/2002 | Park et al. | 345/428 |

OTHER PUBLICATIONS

Bergman, L. et al., "Image Rendering by Adaptive Refinement", *International Conference on Computer Graphics and Interactive Techniques, Proceedings of the 13$^{th}$ Annual Conference on Computer Graphics and Interactive,* 1986, 29–37.

Garey, M.R. et al., "Triangulating a Simple Polygon", *Inform. Process. Lett.,* 1978, 7, 175–179.

Lalonde, P. et al., "Shader–Driven Compilation of Rendering Assets", *International Conference on Computer Graphics and Interactive Techniques, Proceedings of the 29$^{th}$ Annual Conference on Computer Graphics and Interactive,* 2002, 713–720.

* cited by examiner

*Primary Examiner*—Matthew C. Bella
*Assistant Examiner*—Daniel Chung
(74) *Attorney, Agent, or Firm*—Woodcock Washburn LLP

(57) ABSTRACT

In order to render a primitive, the primitive is subdivided into trapezoids and triangles. The subdivision occurs using scanline-aligned lines. These simple scanline-aligned regions are further subdivided so that the primitive is divided into simple scanline-boundaried trapezoids and other complex scan shapes. The simple scanline-boundaried trapezoids are rasterized. One rasterization method uses a texture map containing slope-based coverage information to edge areas. Gouraud shading may be used to provide the anti-aliasing effects on the scanline-boundaried trapezoids. The simple scanline-boundaried trapezoids may also be rasterized using a software rasterizer. Complex scans are rasterized using a software rasterizer. As data is already rasterized, it is thereby efficiently transferred to the GPU.

28 Claims, 8 Drawing Sheets

HARDWARE-ACCELERATED ANTI-ALIASED GRAPHICS

FIELD OF THE INVENTION

This invention relates to the graphical display of data. More particularly, this invention relates to anti-aliasing techniques for graphics.

BACKGROUND OF THE INVENTION

In order to display a graphical object using the pixels on a computer screen or other display device, the object is mapped onto a grid of pixels known as a framebuffer. Each pixel is mapped to a square area of the object. Using this mapping, one of a number of conventional techniques can be used to calculate a set of pixel values for each pixel. These pixel values include, conventionally, three color values (red, green, blue) and an alpha value, which is a transparency value. Conventionally, the pixel values for a pixel are determined by evaluating a function of the object at a point that corresponds to the center of the pixel.

Often, during rendering, the edges of a shape as rendered will exhibit jaggedness even though the edge was intended to be smooth. Such unwanted effects, known as aliasing effects, are notoriously obvious to the human eye. In order to reduce such effects, anti-aliasing is performed. Anti-aliasing techniques reduce aliasing effects, and thereby produce graphics superior to those produced without the use of such anti-aliasing techniques.

In order to satisfy performance requirements, anti-aliasing must take place in the graphics-optimized environment of the graphics card. High-quality graphics rendering systems may include anti-aliasing techniques, but because of the memory and processor requirements, on some general-purpose graphics cards, full-scene anti-aliasing techniques are not included. Where it is included, the full-scene anti-aliasing techniques are resource intensive, and in some cases do not provide quality rendering. Some graphics cards do include other anti-aliasing techniques, such as anti-aliasing of edges; however, support for such techniques is not broad, and the developer of an application cannot rely on such support. Even where full-scene anti-aliasing is included on a graphics card, the memory requirements on the card can be large and the performance does not support demanding real-time graphics.

Thus, there is a need to implement anti-aliasing of graphics objects for real-time graphics without requiring new functionality beyond that currently present in most graphics cards, without requiring large increases in processing or memory usage in the graphics card, and without relying on techniques which are not widely supported in existing graphics cards.

SUMMARY OF THE INVENTION

High quality per-primitive anti-aliasing is provided which can work across a broad set of graphics cards. In one embodiment, a primitive is subdivided into scanline-aligned trapezoids and triangles. These simple scanline-aligned regions are further subdivided so that scanline borders form the borders of simple scanline-boundaried trapezoids. Scanline-boundaried trapezoids are scanline-aligned trapezoids in which the two sides of the trapezoid which are parallel to the scanlines fall on scanline boundaries and the other two edges of the trapezoids are edges of the primitive. The regions remaining in the primitive which are not included in these scanline-boundaried trapezoids are considered complex scans. Other methods of dividing a primitive into scanline-boundaried trapezoids are also contemplated.

The simple scanline-boundaried trapezoids are rasterized through texture mapping or tessellation and an interpolation mechanism which can be performed easily by the graphics card, such as Gouraud shading, and the complex scans are rasterized by a software rasterizer. In another embodiment, both the scanline-boundaried trapezoids and the complex scans are rasterized by a software rasterizer.

Other aspects of the present invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings example constructions of the invention; however, the invention is not limited to the specific methods and instrumentalities disclosed. In the drawings.

DETAILED DESCRIPTION OF ILLUSTRATIVE EMBODIMENTS

Exemplary Computing Environment

Figure 1:
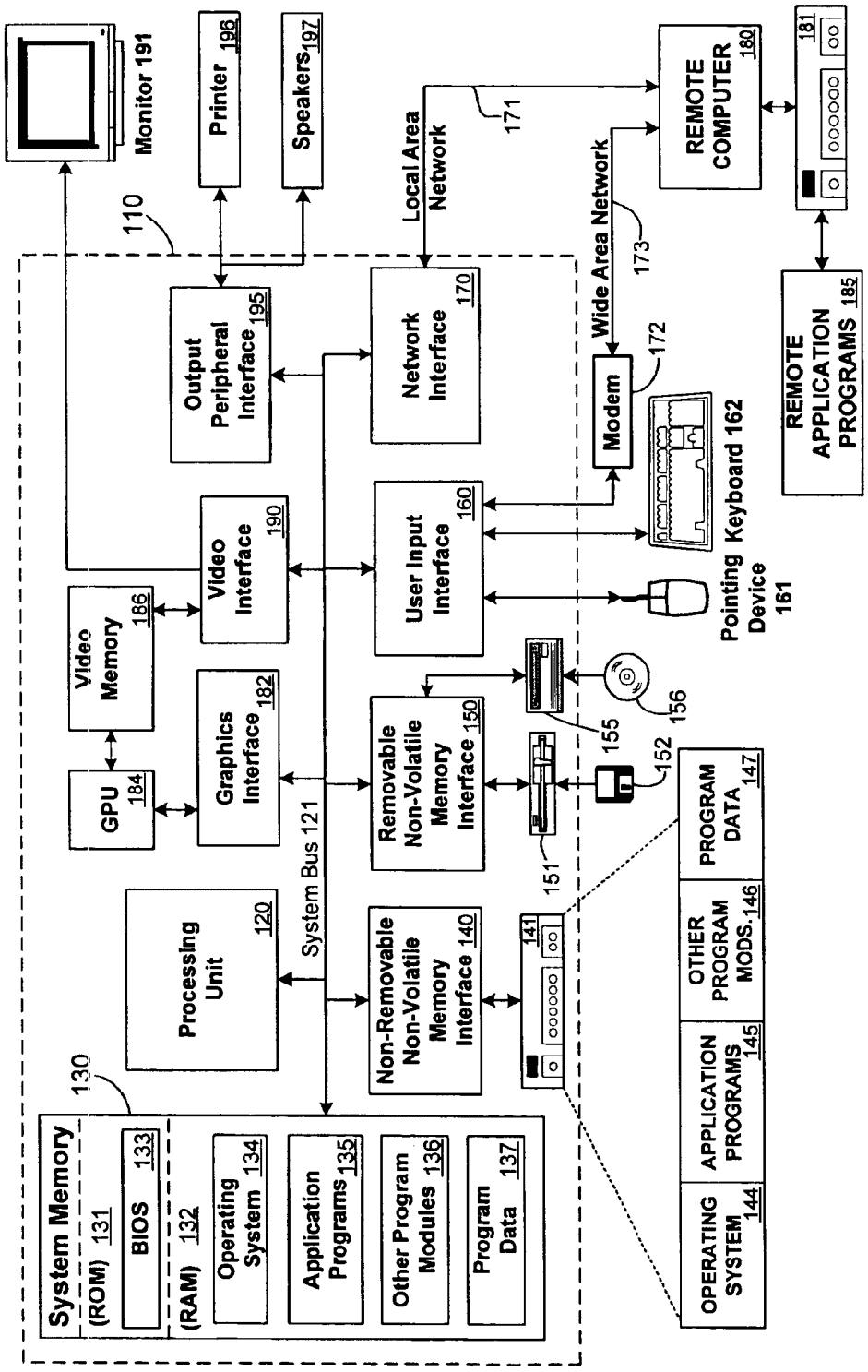
FIG. 1 is a block diagram of an example computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The processing unit 120 may represent multiple logical processing units such as those supported on a multi-threaded processor. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus). The system bus 121 may also be implemented as a point-to-point connection, switching fabric, or the like, among the communicating devices.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Graphics Processing

Because of the complexity of displaying graphics, specialized subsystems are included in computer systems for handling graphics data. With reference to FIG. 1, a program such as application program 135 communicates over system bus 121 with processing unit 120 and with GPU 184 though graphics interface 182. GPU 184 places data into video memory 186, where it is communicated for display, for example on monitor 191. For some data which is to be displayed, pixel data is transmitted to GPU 184 and stored in video memory 186 with little processing necessary. For example, the display of a bitmapped image may not require complicated graphics processing by GPU 184.

However, in some applications, for example, gaming applications, new shapes and views are created in real-time. Instead of pixel data, GPU 184 receives vertex data from such applications. The vertex data includes location, color, and transparency data for graphics primitives. This vertex data is transformed by the GPU 184 into geometric data which is rendered to a grid for display.

Hardware-Accelerated Anti-Aliased Vector Graphics

In order to display an image comprising primitives onto a grid of pixels for display (e.g. on a screen), information regarding the primitives which make up the image must be converted into a pixelized image.

Figure 2:
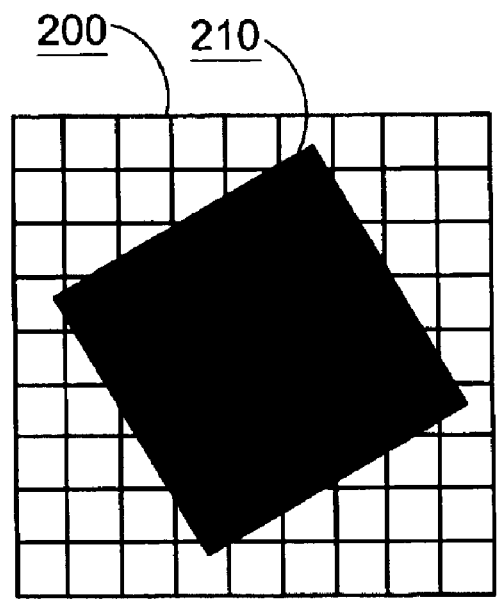
FIG. 2 is a diagram of an example frame buffer and primitive according to one embodiment of the invention.

In order to more clearly describe the invention, an example primitive will be used. FIG. 2 is a diagram of an example framebuffer and primitive according to one embodiment of the invention. As shown in FIG. 2, a framebuffer 200 is an array memory into which an image is stored, pixel by pixel. Primitive 210 is a shape which is to be rendered to framebuffer 200.

Obtaining Scanline-Aligned Regions

Figure 3:
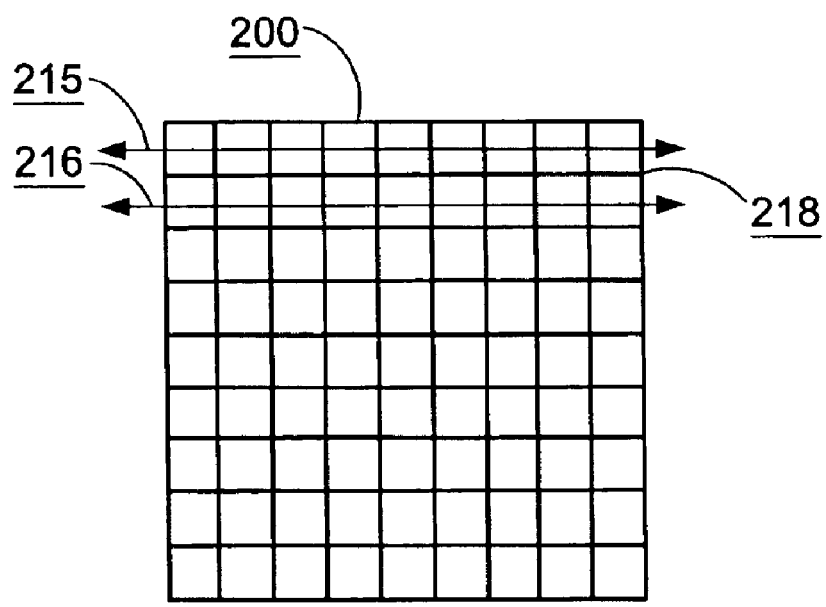
FIG. 3 is a diagram of an example frame buffer and scanline according to one embodiment of the invention.

In order to render high-quality vector graphics on displays, each primitive is first subdivided into scanline aligned trapezoids and triangles. A scanline is a row of pixels on the raster display on which primitive 210 is to be displayed. FIG. 3 is a diagram of an example framebuffer and scanline according to one embodiment of the invention. The scanline 215 shown in FIG. 3 is the top row of pixels of framebuffer 200, and the scanline 216 is the next row of pixels of framebuffer 200. In order to divide a primitive into scanline-aligned trapezoids and triangles, lines parallel to the scanline are used to divide the primitive into constituent regions.

Figure 4:
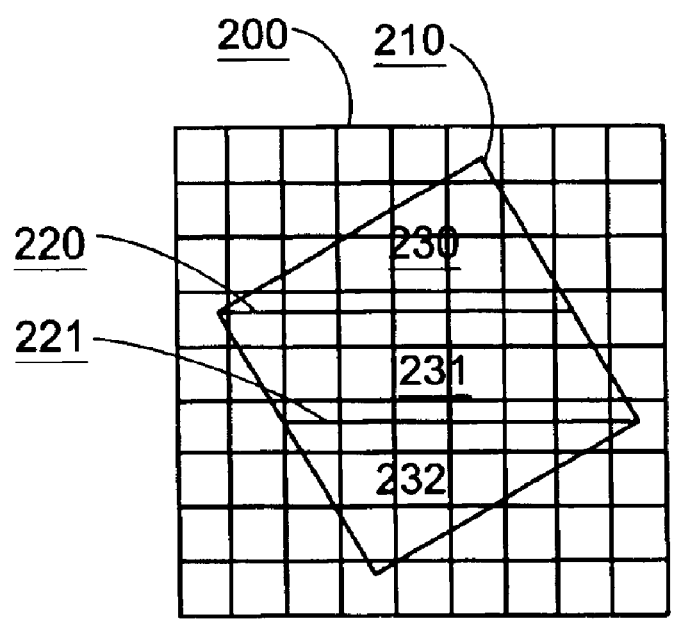
FIG. 4 is a diagram of an example framebuffer and subdivided primitive according to one embodiment of the invention.
Figure 5:
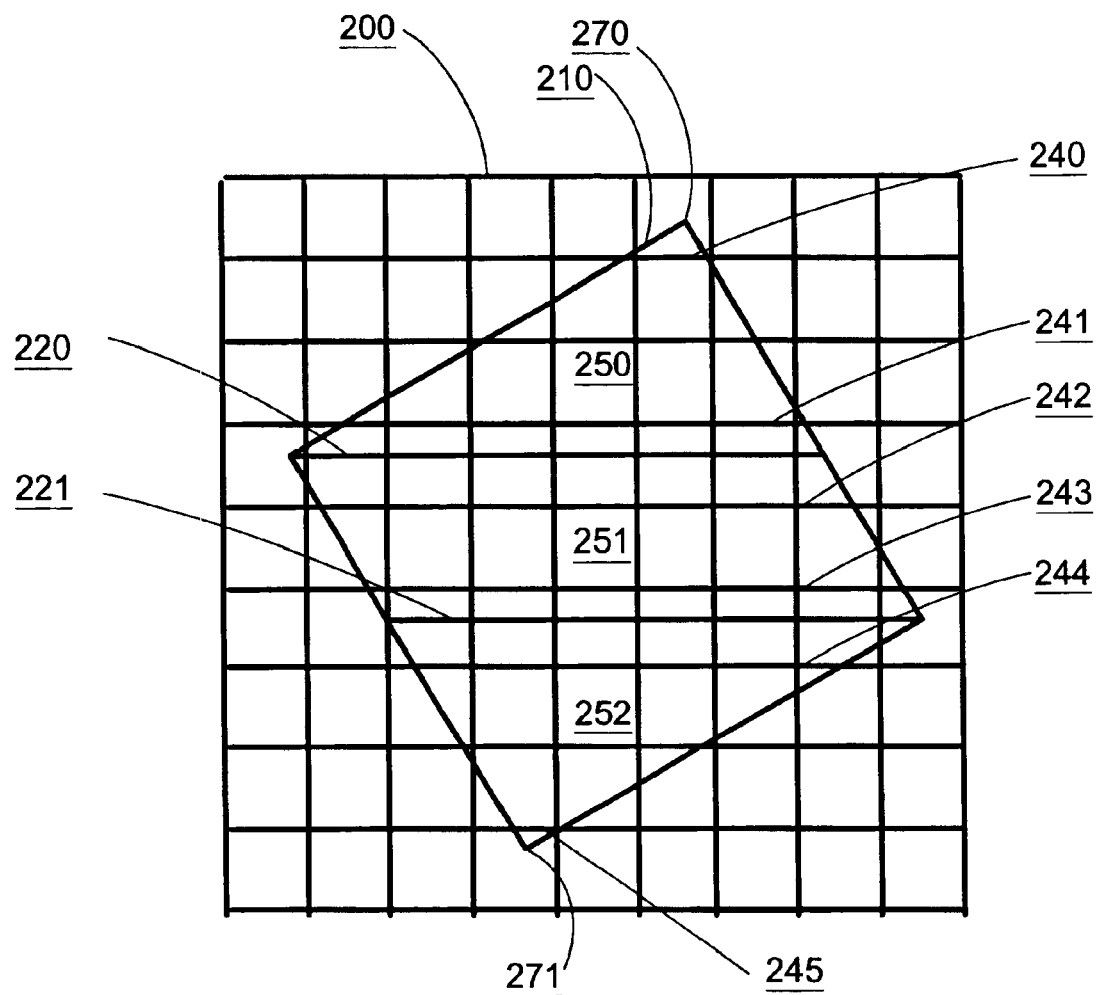
FIG. 5 is a diagram of an example framebuffer and primitive subdivided into scanline-boundaried regions and complex scans.

FIG. 4 is a diagram of an example framebuffer and subdivided primitive according to one embodiment of the invention. In FIG. 4 and subsequent figures, the framebuffer 200 has been shown in grey rather than black to aid comprehension of the figure. As shown in FIG. 4, lines which are parallel to the scanlines are used to divide the primitive 210. These scanline-aligned lines 220 and 221 divide the primitive 210 into three regions 230, 231, and 232. These regions are considered scanline-aligned regions.

In one embodiment, scanline-aligned regions may be trapezoids and triangles. Trapezoids are quadrilaterals with at least one pair of parallel sides. For a trapezoid to be scanline-aligned, one pair of parallel sides of the trapezoid must be scanline-aligned. In FIG. 4, it can be seen that region 231 is a quadrilateral with one pair of parallel sides, and that the parallel sides are formed by the parallel scanline-aligned lines 220 and 221. For a triangle to be scanline-aligned, a side of the triangle must be scanline-aligned. Regions 230 and 232 are scanline-aligned triangles. This is because one side of the triangle that is region 230 is scanline-aligned line 220, and one side of the triangle that is region 231 is scanline-aligned line 221.

With reference to FIG. 1, in one embodiment the subdivision of the primitive into scanline-aligned regions is done by processing unit 120. This may be done using a modified rasterizer sweep algorithm. Several well-known algorithms can be used to divide of primitives into simple regions, including triangulation of primitives. One sweep algorithm is described in M. R. Garey, D. S. Johnson, F. P. Preparata, and R. E. Tarjan. *Triangulating a Simple Polygon*. Inform. Process. Lett., 7:175–179 (1978). Any method of dividing the primitive into scanline-aligned regions is contemplated as being used in this invention.

Subdividing Scanline-Aligned Regions into Scanline-Boundaried Trapezoids and Complex Scans Scanline-aligned regions are then further divided. The goal of the further division is to find scanline-boundaried trapezoids which can be rasterized according to a first method, and the remaining areas of the primitive are more complex scans, which are rasterized according to a second method.

A scanline boundary is the border between two scanlines. With reference again to FIG. 3, scanline boundary 218 is the boundary between scanlines 215 and 216. Scanline-boundaried trapezoids are scanline-aligned trapezoids in which the two sides of the trapezoid which are parallel to the scanlines fall on scanline boundaries and the other two edges of the trapezoids are edges of the primitive 210.

In order to further divide the primitive into scanline-boundaried trapezoids, additional lines are used. These scanline boundary lines 240, 241, 242, 243, 244, and 245 separate the primitive 210 into regions, including regions 250, 251, and 252. These regions are scanline-boundaried trapezoids. For example, region 250 is a trapezoid with parallel sides falling on scanline boundary 240 and scanline boundary 241. Regions 250, 251, and 252 are all scanline-boundaried trapezoids.

In one embodiment, in order to select scanline boundary lines to use to subdivide a primitive into scanline-boundaried trapezoids and complex scans, each of the scanline-aligned lines which has divided the primitive into scanline-aligned regions is considered. For each scanline-aligned line, if the scanline-aligned line is also a scanline boundary line, nothing further is done. However if, as in the case of scanline-aligned lines 220 and 221, the scanline-aligned line is not a scanline boundary line, then the scanline boundary lines immediately above and below the scanline-aligned line is used to further divide the primitive. For example, in the case of scanline-aligned line 220, scanline boundary lines 241 and 242 are added. This accounts for the inclusion of scanline boundary lines 241 through 244.

Additionally, the scanline boundary immediately below any vertex such as vertex 270 which is a local maximum in the Y-dimension is added, as is the scanline boundary immediately above any vertex 271 which is a local minimum in the Y-dimension. This accounts for the inclusion of scanline boundary lines 240 and 245.

Figure 6:
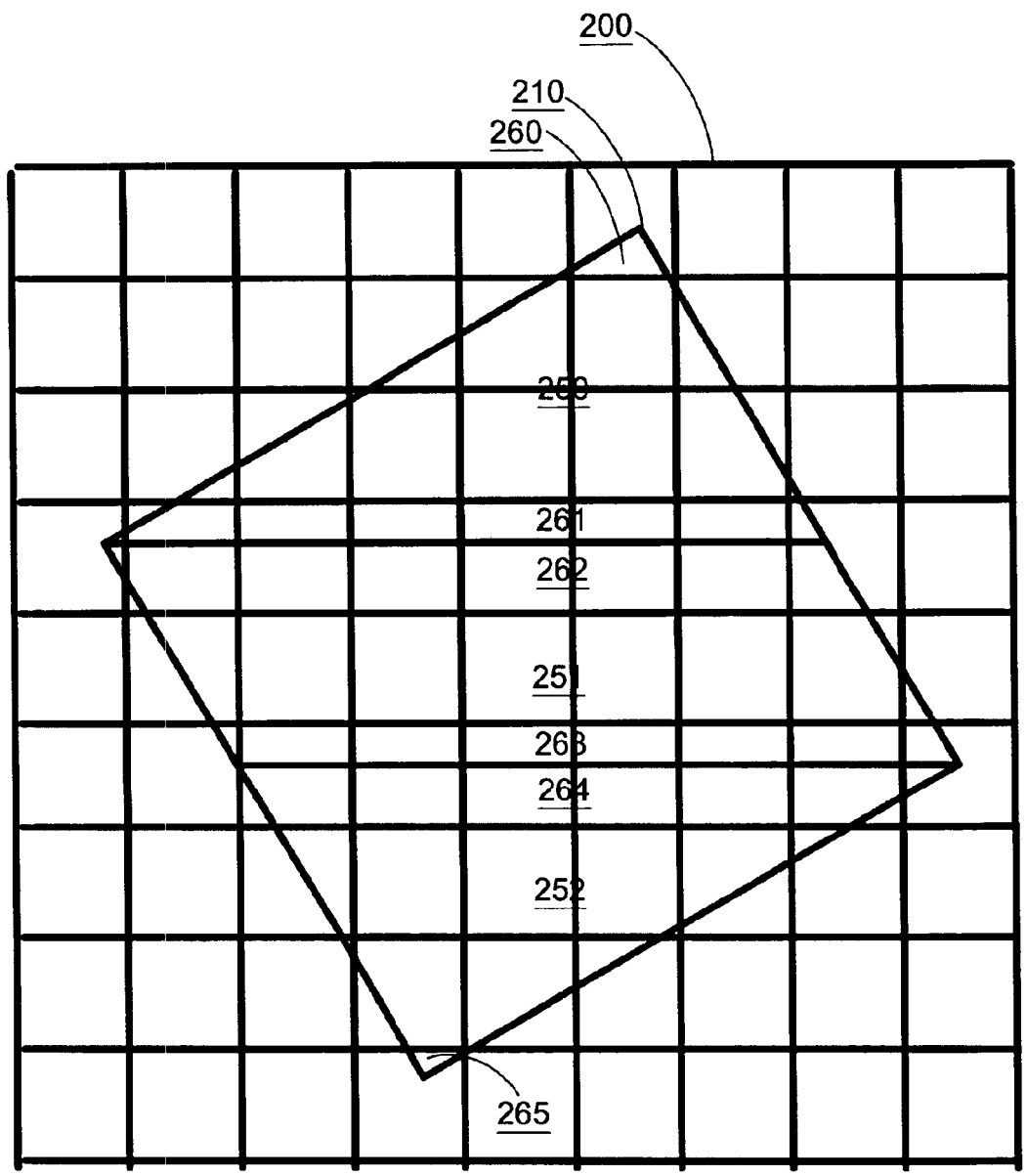
FIG. 6 is a diagram showing an enlarged view of an example framebuffer and primitive subdivided into scanline-boundaried regions and complex scans.

FIG. 6 is a diagram showing an enlarged view of the example framebuffer and primitive subdivided into scanline-boundaried regions and complex scans. It can be seen in FIG. 6 that the primitive 210 has been divided into scanline-boundaried trapezoids 250, 251, and 252. Any area which is not part of a scanline-boundaried trapezoid is considered a complex scan region. Therefore the remaining areas 260, 261, 262, 263, 264, and 265 are complex scan regions.

While in one embodiment, the division of the primitive into scanline-boundaried trapezoids and complex scans occurs as detailed above, with an intermediate step of dividing the primitive into scanline-aligned shapes, other methods of dividing the primitive into scanline-boundaried trapezoids and complex scans are contemplated. For example, a greedy search technique is contemplated. Such a technique might create scanline-boundaried trapezoids by randomly selecting scanline-boundaries to define a region, discarding the region if it is not a trapezoid, and then determining whether increasing the trapezoidal region by using a scanline boundary outside of the trapezoid to replace the closest parallel side of the trapezoid would still result in a scanline-boundaried trapezoid. In general, any technique which produces a decomposition of the primitive into scanline-boundaried trapezoids (and, if not fully composed of scanline-boundaried trapezoids, into scanline-boundaried trapezoids and complex scans) is contemplated. In one embodiment, this decomposition is performed by processing unit 120 in one sweep of the primitive.

Rasterizing a Primitive

Once the decomposition of the primitive into scanline-boundaried trapezoids and complex scans has been accomplished, the primitive is rasterized. One rasterization method is used to rasterize the scanline-boundaried trapezoids, and another rasterization method is used to rasterize the complex scans.

As seen in FIG. 6, an edge of primitive 210 may include neighboring segments, one of which is included in a scanline-boundaried trapezoid, and the other of which is included in complex scans. For example, the upper right hand edge of primitive 210 begins as a side of region 260, which is a complex scan, then includes a side of region 250, which is a scanline-boundaried trapezoid, then includes the sides of two complex scans, regions 261 and 262, and then a side of another scanline-boundaried trapezoid, region 251, and finally a side of complex scan 263. Therefore though rasterization of the scanline-boundaried trapezoids and the complex scans occur using different methods, both methods must produce results which are harmonious when displayed side by side.

Rasterizing a Scanline-Boundaried Trapezoid

In order to rasterize primitive 210, it can be seen that the non-scanline-aligned edges of each of the scanline-boundaried trapezoids, must be rasterized. These sloped edges may pass through a number of pixels in framebuffer 200. Additionally, because anti-aliasing is required, a pixel which is near a sloped edge, although the edge does not pass through the pixel, may also be included in the coverage for that edge.

Figure 7:
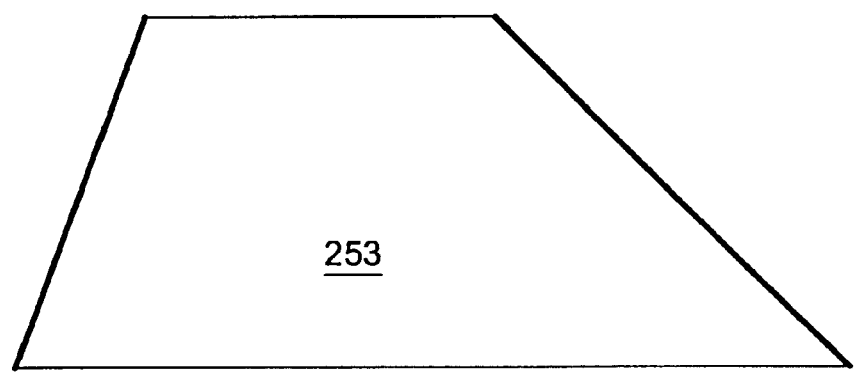
FIG. 7 is a diagram showing an example scanline-boundaried trapezoid.

For any particular pixel, the analytic coverage for the pixel can be defined as a function of the slope of the edge, the distance from the center of the pixel, and an indication of whether the edge is above or below the center of the pixel. For example, the analytic coverage for a pixel may be a one pixel box filter. FIG. 7 is a diagram of a scanline-boundaried trapezoid 253. It can be seen that the edges of the scanline-boundaried trapezoid 253 have different slopes.

Figure 8:
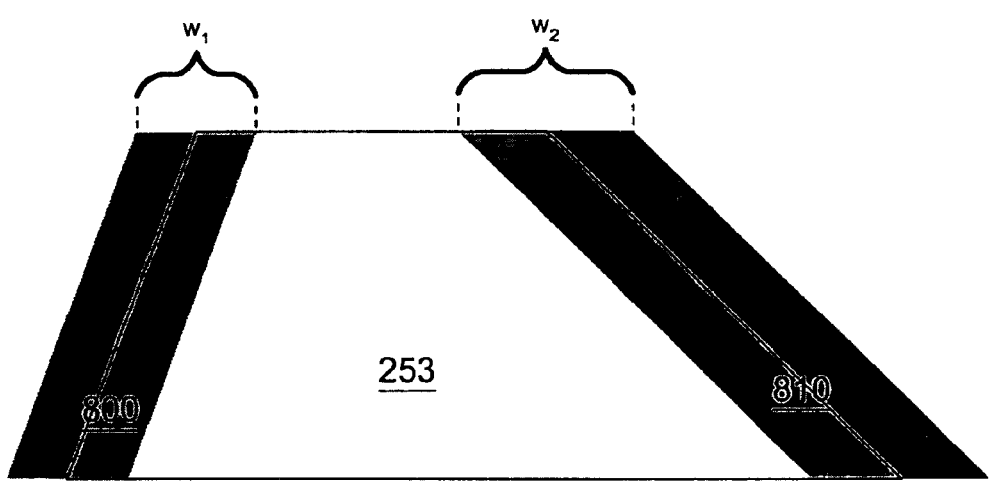
FIG. 8 is a diagram showing an example scanline-boundaried trapezoid with edge areas shaded.

In order to render these edges, an edge area around each edge is defined, as shown in FIG. 8. The width of the edge area is based on the slope of the edge. The width of the edge area is calculated in one embodiment as shown in equation 1:

$$\text{width} = 1 + |1/\text{slope}| \quad [1]$$

Figure 9:
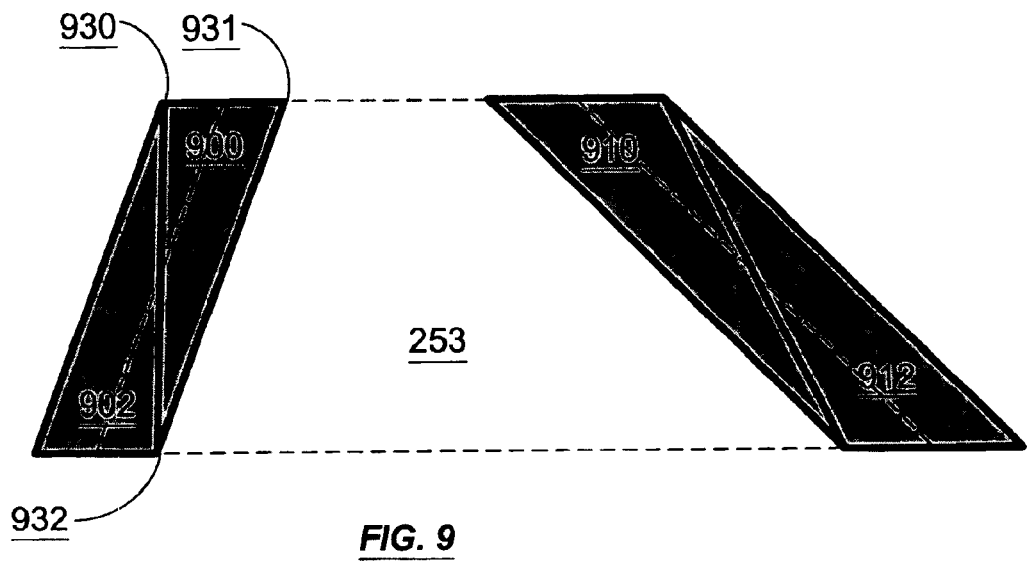
FIG. 9 is a diagram showing an example scanline-boundaried trapezoid with edge areas shaded and decomposed into triangles.

As shown in FIG. 8, because the slopes of the two edges are different, the widths of the two edge areas 800 and 810 are different. The width $w_1$ of edge area 800 is proportional to the slope of the left edge of scanline-boundaried trapezoid 253, and the width w2 of edge area 810 is proportional to the slope of the right edge of scanline-boundaried trapezoid 253. As shown in FIG. 9, edge area 800 has been divided into two triangles 900 and 902, and edge area 810 has been divided into two triangles 910 and 912. In FIG. 9, the edges of scanline-boundaried trapezoid 253 has been shown as a dotted line in order to aid comprehension of the figure. Up to this point, the calculations are performed by the processing unit 120.

Texture Filtering of the Edges

In order to render edge areas, texture filtering is used. Texture filtering involves the use of texture mapping for filtering purposes. Texture mapping is a technique for adding realism to a computer-generated scene. Texture mapping lays an image (the texture) onto an object in the scene. Because texture mapping is so useful, it is provided as a standard rendering technique both in graphics software interfaces and in computer graphics hardware. For most GPUs like GPU 184 shown in FIG. 1, texture mapping facility will be provided.

When mapping a texture onto an object, the color and/or transparency of the object at each pixel is modified by a corresponding color and/or transparency from the texture. Textures are made up of texels. When a texture is applied to an object, the mapping of texels to pixels need not be one-to-one. To create a smooth texture application where there are fewer texels than pixels or in other situations where pixel centers do not line up exactly with texel centers, graphics cards support bilinear texture filtering. Bilinear texture filtering averages four adjacent texels and interpolates, creating new texel data.

In order to use texture mapping to shade edge area triangles, a texture is created with transparency (alpha) values that vary.

To do this, it is noted that for each edge of a trapezoid, the slope will be constant. For that slope, coverage for a pixel will be based on the distance of the edge from the center of the pixel. A pixel with a center 0.3 pixels below an edge with a first slope will have a different coverage than a pixel with a center 0.3 pixels below an edge with a second slope.

This type of coverage can be implicitly computed with a precomputed texture. For example, a texture may be created in which each column of the texture represents the coverage curve for a particular slope and each row of the texture represents a distance of the edge of the trapezoid from the center of the pixel. As discussed above, whether the edge is above or below the center of the pixel is considered; the distance from the center of the pixel is considered along with this information. In one embodiment, a pixel in which the edge passes 0.3 pixels above the center of the pixel at slope $m_1$ is mapped to one location in the texture value from the texture lookup table, while a pixel in which the edge passes 0.3 pixels below the center of the pixel at slope $m_1$ is mapped to a separate location. In one embodiment, a 256 by 256 texture is created.

With this texture, the edges of a scanline-boundary aligned trapezoid can be rasterized using a triangulation and the application of the texture. The texture works as a function lookup to the coverage curve for a particular slope. With reference again to FIG. 9, each triangle is defined by its vertices. For example, vertices 930, 931, and 932 are used to define triangle 900. Information on the slope of the edge and the distances of each vertex from the edge is used to find a texture mapping for triangle 900. The same occurs for triangles 902, 910, and 912, and for the triangles making up the edges to be drawn for each scanline-boundaried trapezoid. This information is sent to the GPU 184. By applying the texture to the triangles, the GPU performs the anti-aliasing of the edges represented by the triangles using the texture mapping facility provided in the GPU 184. Dedicated anti-aliasing facilities may not exist in GPU 184 or may be more resource intensive, but anti-aliasing is achieved without necessitating such dedicated anti-aliasing facilities.

Figure 10:
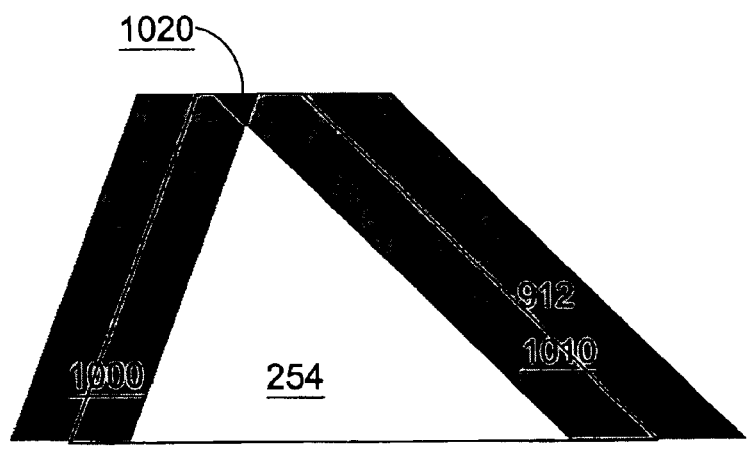
FIG. 10 is a diagram showing a scanline-boundaried trapezoid which with overlapping edge areas.

If the edge areas for a scanline-boundaried trapezoid overlap, in one embodiment of the invention, the scanline-boundaried trapezoid is considered a complex scan. FIG. 10 is a diagram showing such a scanline-boundaried trapezoid which with overlapping edge areas. The left edge area 1000 of scanline-boundaried trapezoid 254 intersects with the right edge area 1010 of scanline boundaried-trapezoid 254. This intersecting area is highlighted in FIG. 10 as intersecting area 1020. In another embodiment, the scanlines which intersect the intersecting area 1020 are treated as complex scans. When these complex scans are removed from scanline boundaried-trapezoid 254, the remaining part of scanline-boundaried trapezoid 254 is also a scanline boundaried-trapezoid, and can be rasterized as one.

Additionally, because the possible widths generated by Equation 1 is unbounded, since the slope of an edge may approach zero, in one embodiment limit for permissible width w is selected. If an edge of the scanline-boundaried trapezoid will cause a width w for the edge area which is greater than the limiting width, the scanline-boundaried trapezoid is considered a complex scan.

Interpolation Shading of the Edges

Another method for rendering the edges of scanline-boundaried trapezoids is to use an interpolation mechanism which exploits some capacity already present in the GPU 184. One example of such an interpolation mechanism is the use of Gouraud shading. The Gouraud shading technique is also known as "intensity interpolation shading". Gouraud shading is a technique for shading a graphics object. When Gouraud shading is applied to a polygon, each vertex of the polygon is assigned a color and transparency. If a different color or transparency value is specified for a different vertex, when the polygon is rendered, a smooth interpolation is performed across the surface of the polygon. This technique is conventionally used to allow for smooth variations in color of complex shapes to allow for more natural shading in an object composed of several graphics primitives.

In order to use Gouraud shading for the edges, the edge areas are tessellated. Each vertex of the edge area is assigned a transparency value corresponding to the distance of the vertex from the edge. In this way a linear falloff will be created using the Gouraud shading capability in the GPU 184 to perform the anti-aliasing of the edge. In another embodiment, the transparency value assigned to each vertex of the edge area is based on both the distance of the vertex from the edge and the slope of the edge.

Since Gouraud shading is widely supported in graphics cards and may be accomplished in real-time without noticeable performance degradation, this allows real-time anti-aliasing with standard graphics cards.

Other interpolation mechanism which uses functionality of the GPU 184 may also be used to perform this interpolation. For example, vertex shader or pixel shader functionality may be used in order to accomplish the interpolation.

Rasterizing Complex Scans

Complex scans are all regions of the primitive not included in a scanline-boundaried trapezoid (in one embodiment, with the additional non-overlap and width requirements detailed above). In one embodiment, complex scans are one scanline in height. In such an embodiment, if several scanlines separate two scanline-boundaried trapezoids, then each of these scanlines will include a separate complex scan. In order to rasterize complex scans, a software rasterizer is extended to compute coverage, on a per-pixel basis, based on the area contributed by the complex scan to the pixel. Analytic coverage is computed for the pixels. These scanlines are then transferred to the GPU 184. Because the coverage being computed by the software rasterizer is analytic coverage, just as the coverage stored in the texture map corresponds to the analytic coverage, the pixel coverage set as part of a complex scan will match any adjoining pixels whose coverage has been computed as part of a scanline-boundaried trapezoid. In one embodiment, this method is also used to rasterize the scanline-boundaried trapezoids. In one embodiment, rather than computing coverage analytically, a sample-based rasterizer is used. The region being rasterized is sampled at a high resolution and then a box filter is then used to produce coverage from the sampled data.

In one embodiment, the output is done via a triangle strip. A triangle strip is a series of connected triangles. Because the triangles are connected, there is no need to repeatedly specify all three vertices for each triangle. A list of vertices is provided. The first three vertices define one triangle, the second through fourth vertices define the next triangle, and each additional vertex, along with two previous vertices, define a new triangle. Since the vertices normally have the diffuse colors or texture units associated with them, the insertion of degenerate triangles may be required to produce a single strip that generates the correct output. In another embodiment, a line list is used. A line list is a list of isolated, straight line segments. The number of vertices in a line list must be an even number greater than or equal to two, and each successive pair defines a new line segment. Other drawing primitives supported by GPU 184 are used in other embodiments to transfer the rasterized complex scans to GPU 184.

Final Processing in the GPU

Once data from the scanline-boundaried trapezoids and the complex scans is passed to GPU 184, GPU 184 performs final rendering, including the application of brush properties. This is done using additional texture stages. No additional passes in the internal GPU pipeline are necessary. For every pixel in the primitive, as represented by the data passed to the GPU 184, a color (including a transparency) is obtained from the textures applied, including the texture applied to produce anti-aliased edges in scanline-boundaried trapezoids, and any other textures being applied to the primitive.

Various Embodiments for Hardware-Accelerated Anti-Aliased Vector Graphics

Figure 11:
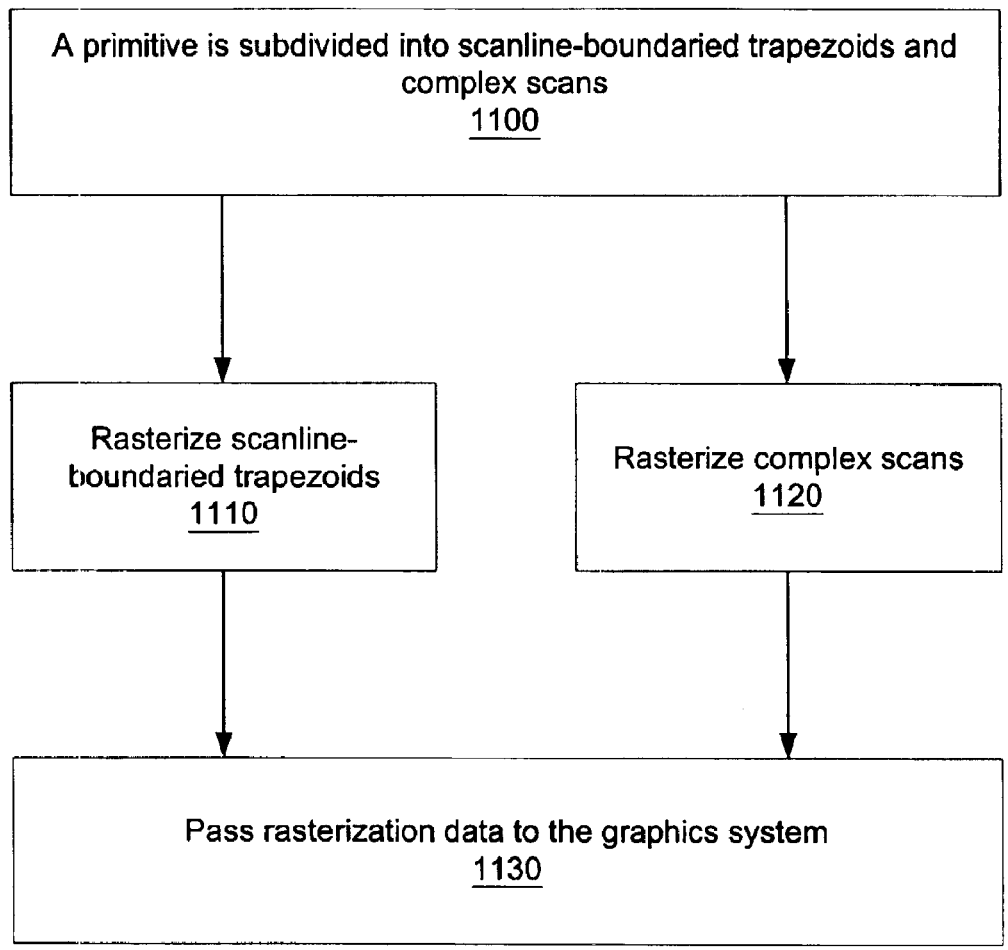
FIG. 11 is a flow diagram of a method for implementing anti-aliased vector graphics.

As shown in FIG. 11, according to one embodiment, a primitive is subdivided into scanline-boundaried trapezoids, step 1100. The remaining regions are considered complex scans. In one embodiment, scanline-boundaried trapezoids which would have overlapping edge areas, or which contain edges which would necessitate edge areas of a width greater than a predefined limit. In a next step 1110, the scanline-boundaried trapezoids are rasterized.

In one embodiment, this rasterization of trapezoids is done as described above, by forming an edge area and applying a texture to it based on the slope of the edge. In another embodiment, the scanline-boundaried trapezoids are rasterized by a software rasterizer extended to compute coverage, on a per-pixel basis, based on the area contributed by the trapezoid to the pixel. Although this may be slower than applying a texture to the edge areas, it may be more flexible. In essence, a compressed transfer of coverage data from the system memory 130 to video memory 186 is accomplished, and the application of brushes and blending can be accomplished in the GPU 184 rather than the processing unit 120.

Contemporaneously, complex scans are rasterized, step 1120. In one embodiment, the complex scans are rasterized by a software rasterizer extended to compute coverage, on a per-pixel basis, based on the area contributed by the trapezoid to the pixel.

In step 1130, data from the rasterizations of the scanline-boundaried trapezoids and the complex scans is passed to the graphics system.

Coverage Using other Sampling Filters

As described above, the texture map stores data corresponding to the analytic coverage for a pixel given the slope and distance from the edge, and the software rasterizer computes analytic coverage for the complex scans. Instead of using analytic coverage (which corresponds to the application of a box filter to the shape) any sampling method may be used. In one embodiment, the sampling method used is represented in the texture map for use to rasterize the scanline-boundaried trapezoids. In another embodiment, the sampling method used is represented in a pixel shader computation, and the shading is passed to GPU 184 for application to edge area shapes.

Conclusion

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A method for rasterizing a graphics primitive for a framebuffer comprising at least two scanlines, said method comprising:

(A) dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

(B) rasterizing at least one of said scanline-boundaried trapezoidal regions according to a trapezoid rasterization method, said trapezoid rasterization method comprising:

(1) creating a first edge area corresponding to a third edge of said trapezoidal region, (2) creating a second edge area corresponding to a fourth edge of said trapezoidal region; and (3) shading said first edge area and said second edge area by (a) applying a texture to said first edge area and (b) applying said texture to said second edge area, where said texture comprises a lookup table for the coverage for a particular pixel where an edge has a specified slope and is a specified distance from said particular pixel, and (C) rasterizing each other region in said graphics primitive using a rasterizer.

2. The method of claim 1 where said coverage comprises analytic coverage.

3. The method of claim 2 where said rasterizer computes analytic coverage for each of said each other regions.

4. The method of claim 1 where said coverage in said lookup table corresponds to a first sampling method, and where said rasterizer computes coverage according to said first sampling method.

5. A method for rasterizing a graphics primitive for a framebuffer comprising at least two scanlines, said method comprising:

(A) dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

(B) rasterizing at least one of said scanline-boundaried trapezoidal regions according to a trapezoid rasterization method, said trapezoid rasterization method comprising:

(1) creating a first edge area corresponding to a third edge of said trapezoidal region, (2) creating a second edge area corresponding to a fourth edge of said trapezoidal region; and (3) shading said first edge area and said second edge area, where said shading said first edge area and said second edge area comprises:

(a) tessellating said first edge area and said second edge area into primitives, where each primitive comprises at least three vertices; and
(b) assigning a transparency value to each of said vertices where said transparency value for a given vertex of a primitive of a given edge area indicates increased transparency proportional to a distance of said given vertex to a corresponding edge to said given edge area, and
(C) rasterizing each other region in said graphics primitive using a rasterizer.

6. The method of claim 5, where said transparency value additionally is based on a slope of said corresponding edge.

7. A method for rasterizing a graphics primitive for a framebuffer comprising at least two scanlines, said method comprising:
(A) dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;
(B) rasterizing at least one of said scanline-boundaried trapezoidal regions according to a trapezoid rasterization method, said trapezoid rasterization method comprising:
(1) creating a first edge area corresponding to a third edge of said trapezoidal region, where said creating a first edge area comprises calculating a width for said first edge area according to a function where for a given edge area, said function returns the result one plus the absolute value of the reciprocal of the slope of the edge corresponding to said edge area,
(2) creating a second edge area corresponding to a fourth edge of said trapezoidal region, where said creating a second edge area comprises calculating a width for said second edge area according to said function; and
(3) shading said first edge area and said second edge area, and
(C) rasterizing each other region in said graphics primitive using a rasterizer.

8. A computer-readable medium for rasterizing a graphics primitive for a framebuffer comprising at least two scanlines, said computer-readable medium with instructions to perform acts comprising:
(A) decomposing said graphics primitive into at least one constituent region, said constituent regions including at least one region of a first type, where said first type of region comprises a trapezoidal region where a first edge of said trapezoidal region falls on a first boundary between two scanlines and where a second edge of said trapezoidal region falls on a second boundary between two scanlines;
(B) rasterizing at least one of said first type of constituent regions according to a first rasterization method, said first rasterization method comprising:
(1) creating a first edge area corresponding to a third edge of said constituent region;
(2) creating a second edge area corresponding to a fourth edge of said constituent region; and
(3) shading said first edge area and said second edge area, said shading comprising: applying a texture to said first edge area: and applying said texture to said second edge area, where said texture comprises a lookup table for the coverage for a particular pixel where an edge has a specified slope and is a specified distance from said particular pixel; and
(C) rasterizing each other constituent region using a rasterizer.

9. The computer-readable medium of claim 8 where said coverage comprises analytic coverage.

10. The computer-readable medium of claim 9 where said rasterizer computes analytic coverage for each of said each other regions.

11. The computer-readable medium of claim 8 where said coverage in said lookup table corresponds to a first sampling method, and where said rasterizer computes coverage according to said first sampling method.

12. A computer-readable medium for rasterizing a graphics primitive for a framebuffer comprising at least two scanlines, said computer-readable medium with instructions to perform acts comprising:
(A) decomposing said graphics primitive into at least one constituent region, said constituent regions including at least one region of a first type, where said first type of region comprises a trapezoidal region where a first edge of said trapezoidal region falls on a first boundary between two scanlines and where a second edge of said trapezoidal region falls on a second boundary between two scanlines;
(B) rasterizing at least one of said first type of constituent regions according to a first rasterization method, said first rasterization method comprising:
(1) creating a first edge area corresponding to a third edge of said constituent region;
(2) creating a second edge area corresponding to a fourth edge of said constituent region; and
(3) shading said first edge area and said second edge area where said shading said first edge area and said second edge area comprises:
(a) tessellating said first edge area and said second edge area into primitives, where each primitive comprises at least three vertices; and
(b) assigning a transparency value to each of said vertices where said transparency value for a given vertex of a primitive of a given edge area indicates increased transparency proportional to a distance of said given vertex to a corresponding edge to said given edge area; and
(C) rasterizing each other constituent region using a rasterizer.

13. The computer-readable medium of claim 12, where said transparency value additionally is based on a slope of said corresponding edge.

14. A computer-readable medium for rasterizing a graphics primitive for a framebuffer comprising at least two scanlines, said computer-readable medium with instructions to perform acts comprising:
(A) decomposing said graphics primitive into at least one constituent region, said constituent regions including at least one region of a first type, where said first type of region comprises a trapezoidal region where a first edge of said trapezoidal region falls on a first boundary between two scanlines and where a second edge of said trapezoidal region falls on a second boundary between two scanlines;
(B) rasterizing at least one of said first type of constituent regions according to a first rasterization method, said first rasterization method comprising:

(1) creating a first edge area corresponding to a third edge of said constituent region; where said creating a first edge area comprises calculating a width for said first edge area according to a function, where for a given edge area, said function returns the result one plus the absolute value of the reciprocal of the slope of the edge corresponding to said edge area;

(2) creating a second edge area corresponding to a fourth edge of said constituent region, where said creating a second edge area comprises calculating a width for said second edge area according to said function; and (3) shading said first edge area and said second edge area; and (C) rasterizing each other constituent region using a rasterizer.

15. The processing unit for rasterizing a graphics primitive for a framebuffer comprising at least two scanlines, said processing unit comprising:

(A) means for dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

(B) means for rasterizing at least one of said scanline-boundaried trapezoidal regions according to a trapezoid rasterization method, comprising:

(1) means for calculating a first edge area corresponding to a third edge of said trapezoidal region;

(2) means for calculating a second edge area corresponding to a fourth edge of said trapezoidal region; and (3) means for shading said first edge area and said second edge area, said means comprising means for applying a texture to said first edge area and means for applying said texture to said second edge area; where said texture comprises a lookup table for the coverage for a particular pixel where an edge has a specified slope and is a specified distance from said particular pixel; and (C) rasterizer means for rasterizing each other region in said graphics primitive.

16. The processing unit of claim 15 where said coverage comprises analytic coverage.

17. The processing unit of claim 16 where said rasterizer means compute analytic coverage for each of said each other regions.

18. The processing unit of claim 15 where said coverage in said lookup table corresponds to a first sampling method, and where said rasterizer computes coverage according to said first sampling method.

19. A processing unit for rasterizing a graphics primitive for a framebuffer comprising at least two scanlines, said processing unit comprising:

(A) means for dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

(B) means for rasterizing at least one of said scanline-boundaried trapezoidal regions according to a trapezoid rasterization method, comprising:

(1) means for calculating a first edge area corresponding to a third edge of said trapezoidal region;

(2) means for calculating a second edge area corresponding to a fourth edge of said trapezoidal region; and (3) means for shading said first edge area and said second edge area; where said means for shading said first edge area and said second edge area comprises:

(a) means for tessellating said first edge area and said second edge area into primitives, where each primitive comprises at least three vertices; and (b) means for assigning a transparency value to each of said vertices where said transparency value for a given vertex of a primitive of a given edge area indicates increased transparency proportional to a distance of said given vertex to a corresponding edge to said given edge area; and (C) rasterizer means for rasterizing each other region in said graphics primitive.

20. The processing unit of claim 19, where said transparency value additionally is based on a slope of said corresponding edge.

21. A processing unit for rasterizing a graphics primitive for a framebuffer comprising at least two scanlines, said processing unit comprising:

(A) means for dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

(B) means for rasterizing at least one of said scanline-boundaried trapezoidal regions according to a trapezoid rasterization method, comprising:

(1) means for calculating a first edge area corresponding to a third edge of said trapezoidal region, where said means for creating a first edge area comprises means for calculating a width for said first edge area according to a function where for a given edge area, said function returns the result one plus the absolute value of the reciprocal of the slope of the edge corresponding to said edge area;

(2) means for calculating a second edge area corresponding to a fourth edge of said trapezoidal region, where means for creating a second edge area comprises means for calculating a width for said second edge area according to said function; and (3) means for shading said first edge area and said second edge area; and (C) rasterizer means for rasterizing each other region in said graphics primitive.

22. A system for rasterizing a graphics primitive for a framebuffer comprising at least two scanlines, said method comprising:

a graphics primitive decomposer for accepting graphics primitive information and dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

a scanline-boundaried trapezoidal region rasterizer operably connected to said graphics primitive decomposer for rasterizing at least one of said scanline-boundaried trapezoidal regions according to a trapezoid rasterization method, said scanline-boundaried trapezoidal region rasterizer creating a first edge area corresponding to a third edge of said trapezoidal region, creating a second edge area corresponding to a fourth edge of said trapezoidal region, and shading said first edge area and said second edge area, said shading comprising application of a texture to said first edge area where said texture comprises a lookup table for the coverage for a particular pixel where said corresponding edge for an edge area has a specified slope and is a specified distance from said particular pixel; and application of said texture to said second edge area; and a rasterizer operably connected to said graphics primitive decomposer for rasterizing each other region in said graphics primitive.

23. The system of claim 22, where said coverage comprises analytic coverage.

24. The system of claim 23, where said rasterizer computes analytic coverage.

25. The system of claim 22, where said coverage in said lookup table corresponds to a first sampling method, and where said rasterizer computes coverage according to said first sampling method.

26. A system for rasterizing graphics primitive for a framebuffer comprising at least two scanlines, said method comprising:

a graphics primitive decomposer for accepting graphics primitive information and dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

a scanline-boundaried trapezoidal region rasterizer operably connected to said graphics primitive decomposer for rasterizing at least one of said scanline-boundaried trapezoidal regions according to a trapezoid rasterization method, said scanline-boundaried trapezoidal region rasterizer creating a first edge area corresponding to a third edge of said trapezoidal region, creating a second edge area corresponding to a fourth edge of said trapezoidal region, and shading said first edge area and said second edge area where said shading of said first edge area and said second edge area comprises: (a) tessellating said first edge area and said second edge area into primitives, where each primitive comprises at least three vertices; and (b) assigning a transparency value to each of said vertices where said transparency value for a given vertex of a primitive of a given edge area indicates increased transparency proportional to a distance of said given vertex to a corresponding edge to said given edge area; and a rasterizer operably connected to said graphics primitive decomposer for rasterizing each other region in said graphics primitive.

27. The system of claim 26, where said transparency value additionally is based on a slope of said corresponding edge.

28. A system for rasterizing a graphics primitive for a framebuffer comprising at least two scanlines, said method comprising:

a graphics primitive decomposer for accepting graphics primitive information and dividing said graphics primitive into at least one region, said regions comprising at least one scanline-boundaried trapezoidal region, where each of said scanline-boundaried trapezoidal regions comprises a trapezoidal region where a first edge of said trapezoidal region falls on a first boundary between two scanlines and where a second edge of said trapezoidal region falls on a second boundary between two scanlines;

a scanline-boundaried trapezoidal region rasterizer operably connected to said graphics primitive decomposer for rasterizing at least one of said scanline-boundaried trapezoidal regions according to a trapezoid rasterization method, said scanline-boundaried trapezoidal region rasterizer creating a first edge area corresponding to a third edge of said trapezoidal region where said creating a first edge area comprises calculating a width for said first edge area according to a function where for a given edge area, said function returns the result one plus the absolute value of the reciprocal of the slope of the edge corresponding to said edge area, and said scanline-boundaried trapezoidal region rasterizer further creating a second edge area corresponding to a fourth edge of said trapezoidal region, where said creating a second edge area comprises calculating a width for said second edge area according to said function, and said scanline-boundaried trapezoidal region rasterizer further shading said first edge area and said second edge area; and a rasterizer operably connected to said graphics primitive decomposer for rasterizing each other region in said graphics primitive.

* * * * *

UNITED STATES PATENT AND TRADEMARK OFFICE
CERTIFICATE OF CORRECTION

PATENT NO. : 6,954,211 B2 Page 1 of 1
APPLICATION NO. : 10/610662
DATED : October 11, 2005
INVENTOR(S) : Ashraf A. Michail et al.

It is certified that error appears in the above-identified patent and that said Letters Patent is hereby corrected as shown below:

On the Title page, in field (54), in "Title", in column 1, line 2, after "ALIASED" insert -- VECTOR --.

In column 1, line 2, after "ALIASED" insert -- VECTOR --.

In column 13, line 67, in Claim 8, delete "area:" and insert -- area; --, therefor.

In column 15, line 17, in Claim 15, delete "The" and insert -- A --, therefor.

Signed and Sealed this

Tenth Day of November, 2009

David J. Kappos
*Director of the United States Patent and Trademark Office*